No. 872,007. PATENTED NOV. 26, 1907.
R. G. NYE.
LATHE DOG.
APPLICATION FILED FEB. 12, 1906.

WITNESSES.
A. C. Thomas
H. C. Chase

INVENTOR,
R. G. Nye
BY
Howard P. Denison
ATTORNEY.

UNITED STATES PATENT OFFICE.

ROBERT G. NYE, OF OSWEGO, NEW YORK.

LATHE-DOG.

No. 872,007. Specification of Letters Patent. Patented Nov. 26, 1907.

Application filed February 12, 1906. Serial No. 300,742.

*To all whom it may concern:*

Be it known that I, ROBERT G. NYE, of Oswego, in the county of Oswego, in the State of New York, have invented new and useful Improvements in Lathe - Dogs, of which the following, taken in connection with the accompanying drawings, is a full, clear, and exact description.

This invention relates to improvements in lathe dogs in which two jaws are adapted to grip opposite faces of the work to be held in proximity to the face plate of a lathe, one of the jaws having a suitable tail-piece engaging in an aperture in said face-plate, whereby rotary motion is transmitted from the face-plate through the gripping jaws to the work.

One of the objects of my present invention is to enable the jaws to be easily and quickly clamped upon the work and coupled to the face-plate with a greater degree of security than is common to such devices. This object, more specifically stated, is to enable the jaws to be more rapidly adjusted from the maximum to the minimum sizes of work to be clamped than would be possible with devices using screws only for such adjustment.

Another object is to provide means for holding the clamping jaws in their adjusted position when not attached to the work, thereby obviating collapse of the jaws, and expediting the labor of removing and re-inserting the work between the jaws.

A further object is to provide one of the jaws with a tail-piece so arranged that when applied to the face-plate it tends to tighten the grip of the jaws upon the work.

A further object is to hold the toothed rack in engagement with the locking shoulder under yielding pressure of a spring which allows the toothed rack to be readily disengaged from its locking shoulder when assembling the jaws upon the work.

Other objects and uses will be brought out in the following description.

Figure 1:
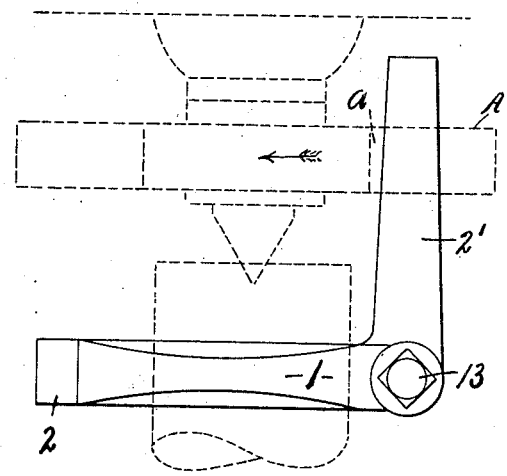
Figure 2:
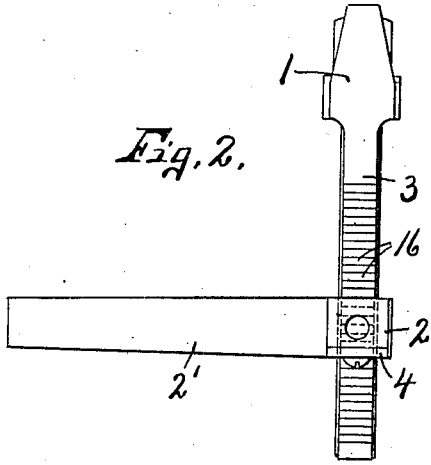
Figure 3:
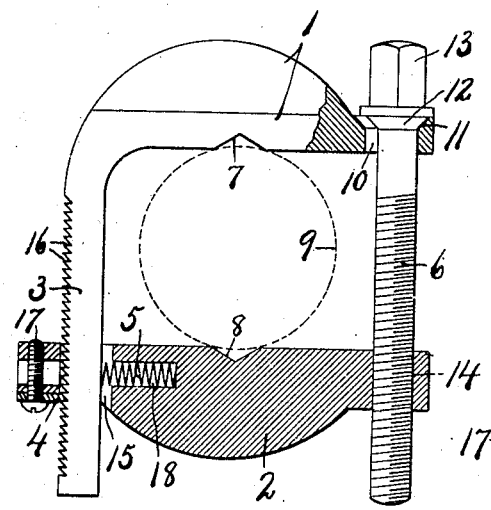
Figure 4:
Figure 5:
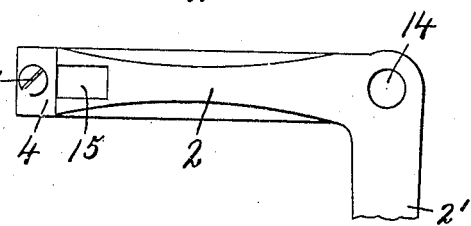

In the drawings—Figure 1 is a top plan of my improved lathe-dog shown as operatively engaged with a face-plate and the work to be clamped thereto, the face-plate and the part of the lathe upon which the lathe-dog is clamped being shown by dotted lines. Fig. 2 is a front elevation partly in section of the lathe-dog seen in Fig. 1. Fig. 3 is a side view of the same. Fig. 4 is a top plan view of the jaw having the integral toothed rack. Fig. 5 is an inverted plan view of the other jaw or the one having the tail-piece, a portion of the tail-piece being broken away.

This lathe-dog comprises essentially two opposed jaws —1— and —2—; a toothed-bar or rack-bar —3— rigidly united to the jaw —1— at substantially right angles thereto; a tail-piece —2' rigidly united to the jaw —2— and projecting axially at substantially right angles thereto; a shoulder —4— on the jaw for engaging the teeth 16 of the rack-bar —3—; a spring —5— for forcing the teeth of the rack-bar —3— into engagement with the stationary pawl —4— and a screw —6— connecting both jaws, for drawing them together upon the work.

The gripping faces of the jaws —1— and —2— are provided with V-shaped cutouts —7— and —8— for engaging the work, as for instance, a shaft —9— shown by dotted lines in Figs. 1 and 2.

The jaw —1— is provided near one end with an elongated slot —10— having a flaring outer end forming a beveled seat —11— for receiving a conical head —12— of the clamping-bolt or screw —6—, which latter is provided with an angular portion 13— for receiving a wrench or similar tool by which the screw may be rotated. The slot 10 is substantially of the same width as the diameter of the unthreaded shank of the bolt 6, but is of sufficient length to permit the requisite "play" between the parts to enable the teeth 16 of the rack-bar 3 to be disengaged from the pawl 4 when assembling the parts of the device upon or removing them from the work.

The threaded end of the bolt —6— is screwed into a threaded aperture —14— in the jaw —2—, and the tapering head —12— and its tapering seat —11— afford a comparatively broad bearing to keep the jaws in more perfect alinement when clamping the same upon the work.

The toothed rack —3— is disposed at the side of the axis of revolution opposite to and substantially parallel with the screw —6—, and is free to slide in an elongated opening or aperture —15— in the jaw —2—, to enable the bar to move against the action of the spring —5— to disengage its teeth from the locking pawl —4— when placing the jaws upon or removing them from the work.

The teeth, —16— of the rack —3—, are so arranged with reference to the locking pawl —4— as to resist outward radial movement of the jaws when clamped upon the work, and in this instance the locking pawl —4— consists of a hardened steel knife-edge plate secured by suitable means, as a screw —17—, to the outerface of the adjacent end of the jaw —2— so as to interpose the strength and resistance of the adjacent end of the said jaw —2— as well as the locking pawl —4— against the strains to which the jaws are subjected when clamped in operative position or drawn upon the work by the screw —6—.

The spring —5— is seated in a suitable socket —18— at the side of the toothed bar —3— opposite to that having the teeth —16—, and therefore, opposite the locking pawl —4— so as to yieldingly hold the toothed rack in engagement with said locking member at all times, either when the jaws are clamped upon the work, or when they are removed from it, thereby keeping the jaws in operative relation to each other ready to be clamped upon similar sized work, or they may be readily moved toward each other upon smaller work by simply pressing them together. In this instance, the teeth —16— act as a ratchet upon the pawl —4— and the opposite end of the jaw —1— is free to slide upon the bolt —6—, thus keeping the gripping faces of the jaws substantially parallel, so that when brought firmly upon the work, all that is necessary to do is to rotate the screw or bolt —6— (which may be done by hand) farther into the threaded socket —14—, until the tapering head 12— is firmly engaged with the seat —11—, whereupon the wrench may be applied to the angular portion —13— for more firmly gripping the jaws upon the work.

The tail-piece 2'— projects axially from the end of the jaw —2— opposite to that in which the toothed rack —3— operates and is adapted to enter an aperture, as —a—, in the face plate, indicated at —A—, of a lathe or other similar machine.

The jaws —1— and —2—; tooth-rack —3— and screw —6— are disposed in substantially the same vertical plane transversely of their axis of revolution and the tail-piece —2'— projecting, as it does, from one end of the jaw —2—, tends when in operation, to force this end of the jaw —2— toward the jaw —1—, and thereby produces a firmer grip of the jaws upon the work, it being understood that the face-plate rotating in the direction indicated by arrow, Fig. 1, engages the tail-piece 2' and produces a constant pull upon the end of the jaw —2— adjacent to the clamp screw toward the jaw —1—, while at the same time the opposite end of the jaw —2— being operatively connected to the toothed rack —3— tends to pull the jaw —1— toward the jaw —2—. This produces a cramping action, and consequently firmer grip of the jaws upon the work when being rotated by the face-plate without liability of throwing the jaws out of their center.

It is obvious upon reference to Fig. 3 that this lathe dog is capable of receiving work equal in size to the space between the screw —6— and toothed rack —3—, or any smaller work, as the jaws —1— and —2— may be brought into close proximity to each other.

In operation, the work is inserted between the jaws, which are then compressed or forced together by hand, thereby causing the teeth of the rack —3— to slide across the knife-edge of the fixed pawl —4— against the action of the spring —5—, which operates to force the rack into holding engagement with the pawl —4— as soon as the adjustment is made, after which the screw —6— is tightened to more firmly grip the jaws upon the work and the tail-piece 2' is then inserted in the opening —a— in the face-plate —A—, whereupon the whole device is ready to be rotated for the purpose desired.

What I claim:

A lathe dog comprising a jaw having a threaded aperture at one end and an elongated slot at the other end, and with a tail piece extending laterally from the end of the jaw having the threaded aperture, a stop pawl carried by said jaw and extending into said slot, an opposing jaw having an elongated aperture through one end and a rack-bar projecting at right angles therefrom at the other end and extending through the slot in the first mentioned jaw, a spring operating to maintain said rack-bar yieldably in engagement with said pawl, and a screw extending through the slot in said last mentioned jaw and provided with an enlarged head bearing upon the same, and engaging said threaded aperture by its threaded portion.

In witness whereof I have hereunto set my hand this 6th day of February 1906.

ROBERT G. NYE.

Witnesses:
    JAS. H. TAYLOR,
    GEO. B. HUNT.